Patented Jan. 1, 1952

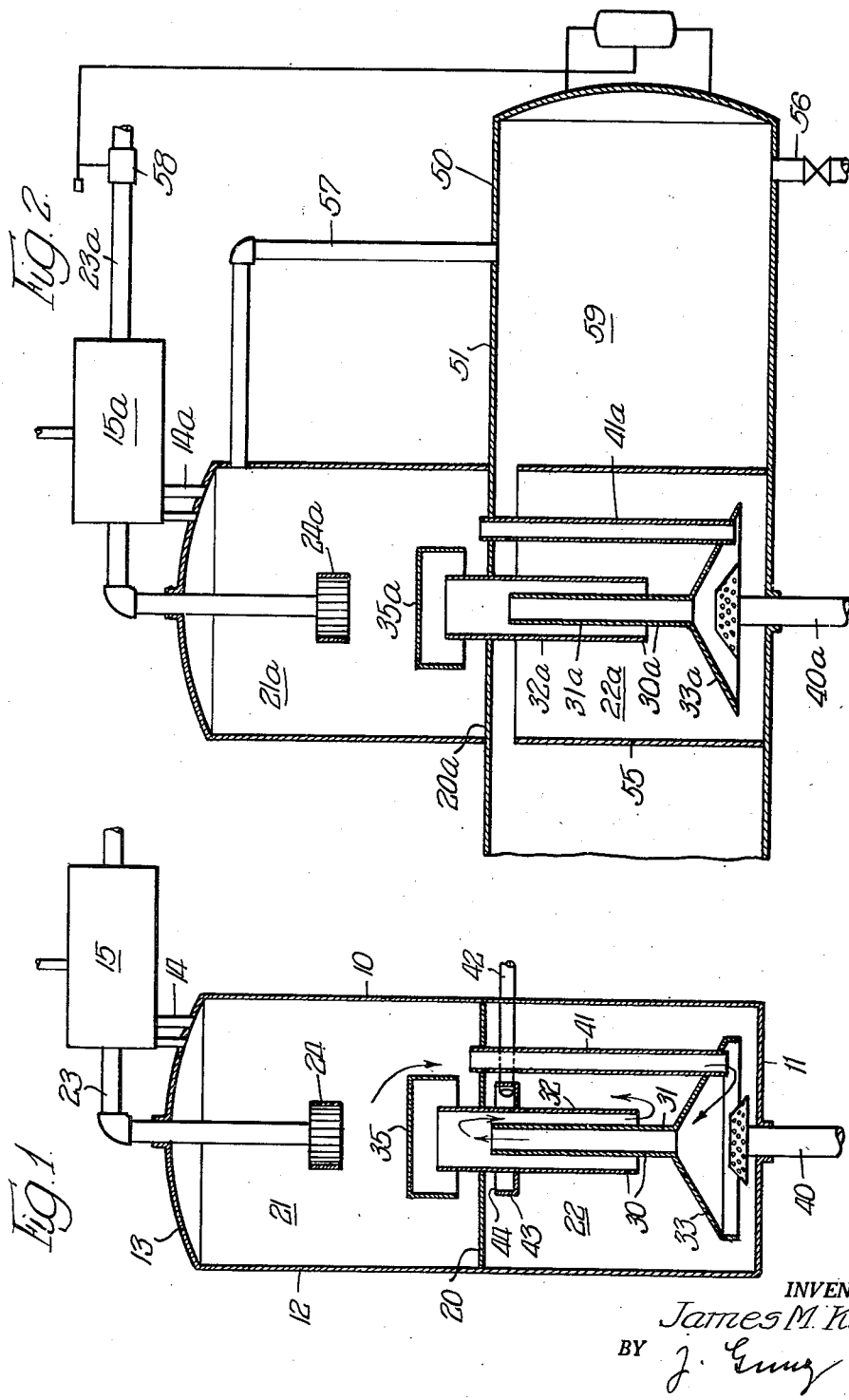

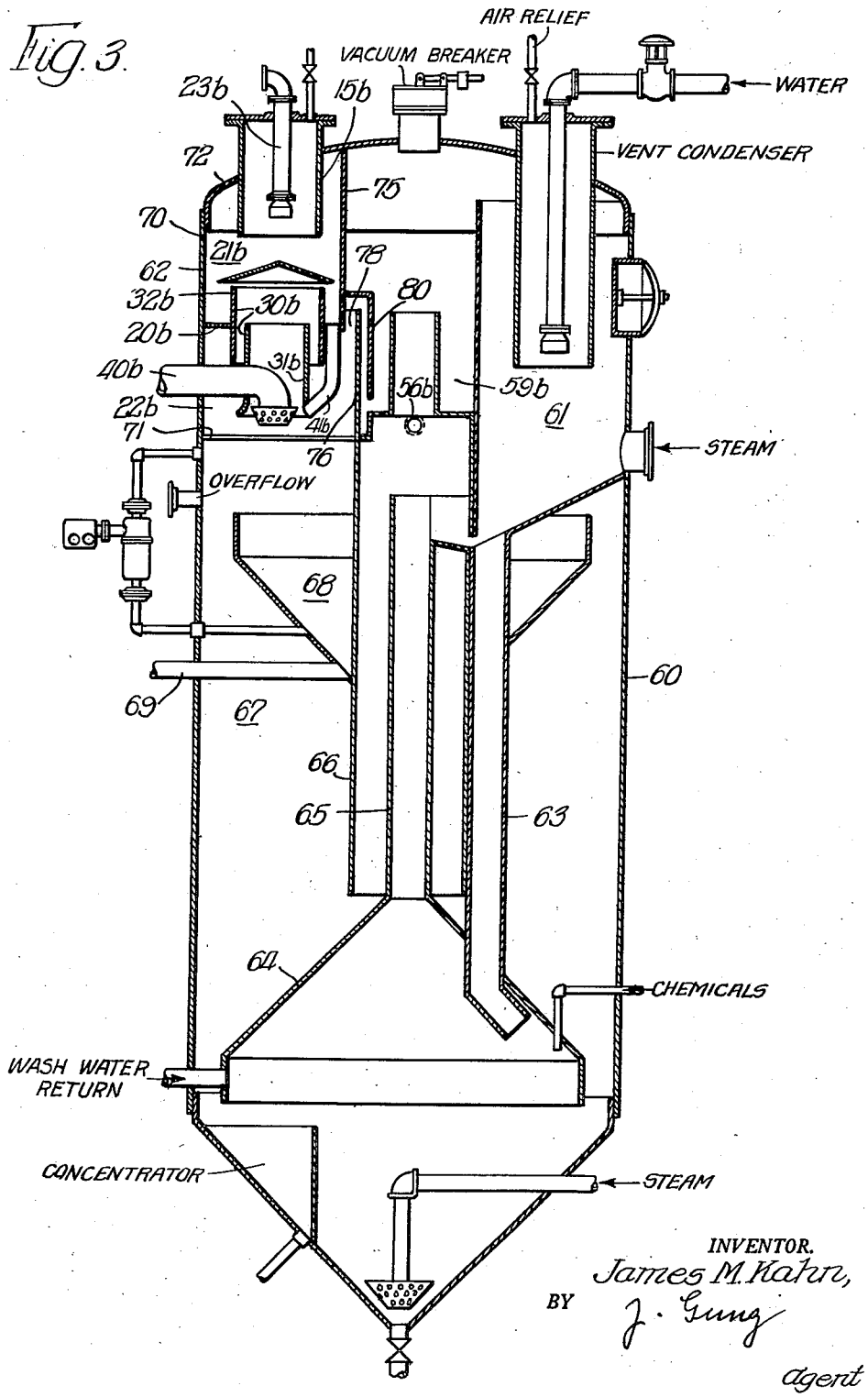

2,580,791

UNITED STATES PATENT OFFICE 2,580,791

DEAERATING APPARATUS

James M. Kahn, Glencoe, Ill., assignor to Infilco Incorporated, Chicago, Ill., a corporation of Delaware Application July 17, 1950, Serial No. 174,197

7 Claims. (Cl. 183—2.5)

This invention relates to an improved deaerating plant and more particularly to heating-deaerating apparatus.

It is an object of this invention to provide a deaerator of this type which is inexpensive in construction and simple and automatic in operation.

Another object is to provide a multi-pass deaerator which is free of moving parts and of splash trays.

Another object of the invention is to provide a deaerator arranged to minimize the loss of head through the deaerator.

Another object is to provide a deaerator with an integral storage compartment.

Another object is to provide a deaerating apparatus wherein short-circuiting is prevented.

Other objects of the invention will become apparent upon consideration of the detailed description and the claims which follow.

My invention is particularly suitable for deaerating boiler feed water where low pressure steam for operating the apparatus is available. However, the invention is not limited to this specific application, but will be useful wherever it is desired to remove dissolved gases from a liquid by heating with steam.

Deaerating apparatus of the type referred to herein operate on the principle that the capacity of water to hold oxygen in solution decreases as the temperature of the water increases, and that in order to remove last traces of oxygen agitation is essential. Various forms of apparatus have been proposed for carrying out this general principle. Usually the water is first heated to a temperature approximating that of the steam used by spraying the water through a steam atmosphere in a primary heating chamber, and thereafter the heated water is agitated in various manners, as by splashing the water on trays, or by atomizing the water with steam jets, or by a combination of these methods. Such agitation as splashing or atomizing necessitates complicated and expensive internal structure and involves a considerable loss of head. It is a special object of my invention to provide a deaerating apparatus which provides the necessary agitation by simpler means than were heretofore used for this purpose.

I have found that I can deaerate water without splashing or atomizing by providing a multiple pass steam-lift circulation of the water in the deaeration zone. I am aware that steam-lift circulation has previously been suggested for deaeration. However, such a circulation was not believed sufficient in and by itself, and was combined with splashing over series of trays in a conventional tray type deaerator, and thus subject to the disadvantages stated above. This combination was important in apparatus of the prior art which lacked positive means for preventing short-circuiting of the water to the outlet prior to its incorporation in the steam lift circulation. In my apparatus I provide such positive means whereby it is impossible for any portion of the water to reach the outlet without previously passing at least once through the path of the steam-lift circulation.

In most cases where deaeration is practiced it is also necessary to provide adequate storage facilities for the deaerated water. Obviously, the deaerator can be used with a separate storage tank. However, in a preferred form of my deaerator the storage tank is integral with the deaerator, the steam-lift compartment of the deaerator being within the storage tank and having an overflow to the storage tank proper. This construction is advantageous as it keeps the loss of head to a predetermined minimum value. However, the storage tank could also be arranged within the treating tank, in the manner shown for a combined water treating and degasifying apparatus in a copending application of Walter H. Green and James M. Kahn, Serial No. 20,548. Ordinarily, however, the treating tank of a deaerator is too small for arranging the storage space within the deaeration tank.

The deaerator can be used as a separate unit, for example for deaeration of treated boiler feed water alone, or condensate alone, or a mixture of both. Where the boiler feed water is hard and must be softened and deaerated and the condensate is only deaerated, my new deaerator and its storage chamber may be installed in the deaerating softener.

The invention will be more readily understood by reference to the drawings, wherein:

Figure 1 shows a vertical cross-sectional view of a deaerator according to the invention;

Figure 2 shows a vertical cross-sectional view of a deaerator similar to that of Figure 1 but with an integral storage tank; and Figure 3 shows a vertical cross-sectional view of a condensate deaerator within a hot process softener-deaerator.

The deaerating apparatus of Figure 1 comprises a cylindrical tank 10 having a substantially flat bottom 11, an upstanding wall 12 and a top 13 which may be removable, or, as shown, integral with the wall 12. A vent 14 leads through the top 13 and may discharge to a conventional vent condenser 15. A partition 20 divides the space within the tank 10 into an upper chamber 21 and a lower chamber 22. An inlet conduit 23 for liquid to be treated passes through the vent condenser 15 and then enters chamber 21 discharging through a sprayhead 24.

A partition structure 30, is axially aligned in the tank 10. The partition structure 30 comprises an inner tube 31 and an outer tube 32. The inner tube 31 has a lower flaring or hood-shaped end 33 spaced above the bottom 11, and extends to an elevation adjacent the partition 20. The outer tube 32 surrounds the upper portion of the inner tube and extends through the partition 20 into the upper chamber 21 to an elevation above the liquid outlet from said chamber. A baffle 35 is provided above and around the upper end of the outer tube 32 to prevent heated water from the primary heating compartment to discharge into the steam separating from the deaerated water in the outer tube 32.

A steam inlet 40 discharges to the space enclosed by the inner tube 31. An outlet conduit 41 leads from the lower portion of the upper chamber 21 into the lower chamber 22 and discharges also to the space enclosed by the inner tube 31. Deaerated liquid is withdrawn from the lower chamber through an outlet conduit 42 leading from a launder 43 which may be arranged peripherally, or centrally, as shown. The weir edge 44 of the launder 43 establishes the normal liquid level in the lower chamber 22.

The structure described above provides an upper or primary heating chamber, a lower steam-lift deaerating chamber, a passageway for a steam-lift supported circulation in the lower chamber including an inner upflow section, an outer downflow section, and an overflow from the inner to the outer section, and an outlet for steam from said passageway to the upper chamber. The water inlet into the lower chamber and the inlet for operating steam discharge into the upflow section of said passageway.

The operation of the deaerating apparatus will be readily understood. Steam under suitable pressure, such as five pounds, discharged through steam inlet 40, into the lower chamber 22 where a pressure of about 2 to 3 pounds prevails, expands, liberating energy. The water into which the steam discharges has already been heated in the upper heating chamber 21 to approximately the temperature of the incoming steam. Therefore, practically no heat transfer takes place and the entire energy liberated by the expansion of the steam is available for pumping power. This energy supports a multiple pass circulation of the liquid upwardly through the inner tube 31 and downwardly through the outer tube 32. The specific gravity of the mixture of steam and water in the inner tube is less than that of water alone; therefore the energy liberated by the expansion of the steam is sufficient to provide a large number of recirculations. Due to the scrubbing action of the steam and water during this circulation gases are liberated. Steam and liberated gases separate from the liquid overflowing the upper edge of the inner tube 31 and pass upwardly through the upper portion of the outer tube 32 and escape into the upper chamber 21. The baffle 35 deflects the steam and gases and distributes them laterally over the cross-sectional area of the chamber 21, and also prevents water in the upper chamber from entering the tube 32. The steam rising in chamber 21 is condensed by the water sprayed into the chamber, heating the water to a temperature approximating that of the steam. A major part of the gases dissolved in the water are liberated by the increase in temperature of the water. The non-condensable gases and any steam that is not condensed rise to the vent 14 from where they are conducted either directly, or, as shown, through the vent condenser 15 to atmosphere.

The preheated and partially deaerated water passes from the upper chamber 21 to the lower chamber 22 through the conduit 41 which discharges into the lower portion of the inner tube 31. Thus the water is immediately mixed with the steam entering through steam inlet 40 and is picked up by, and incorporated in, the steam-lift supported circulation through the inner and outer tubes. It will be noted that in my apparatus the water can enter the lower chamber only through conduit 41. Due to this construction any danger of water reaching the outlet 42 before it has gone at least once through the steam-lift circulation is excluded. Ordinarily, however, the water will pass many times through the circulation before it is discharged from the apparatus.

In case the inflow of water through the inlet conduit 23 stops for any reason, the circulation stops automatically, as under such conditions the pressure in the upper chamber 21 plus the hydrostatic head equals the pressure of the incoming steam.

Figure 2 shows a deaerator with an integral storage tank 50. The storage tank 50 is preferably a horizontal cylinder. In this embodiment of the invention the upper chamber 21a is mounted on the storage tank 50, as shown, the wall 51 of the storage tank providing the bottom 20a of the chamber. Within the storage tank 50 is a partial partition 55 forming the outer wall of the lower chamber 22a. The partial partition 55 provides an overflow from the deaerating chamber 22a which determines the liquid level therein. An outlet conduit 56 leads from the storage tank 50.

The partition structure 30a of this embodiment is practically identical with the partition structure 30 of Figure 1. The upper part of the cylindrical wall of the storage tank 50 is apertured to receive the upper end portion of the outer tube 32a which extends therethrough into the upper chamber 21a. The flared lower end 33a of the inner tube 31a is spaced above the lower part of the cylindrical wall 51 of the storage tank 50 and its upper end is at an elevation adjacent but below the upper part of the wall 51. The steam inlet conduit 40a enters the lower chamber through the lower part of wall 51. The outlet conduit 41a leads from the lower portion of chamber 21a through the upper part of wall 51 into the lower chamber 22a and discharges into the lower portion of the inner tube 31a. The inlet conduit 23a, spray 24a, vent 14a, and vent condenser 15a are the same as in Figure 1.

To equalize the pressures in the upper chamber and in the storage tank a pipe 57 is provided, as shown.

The liquid level in the storage tank 50 may be controlled by any conventional means, such as a float-controlled inlet valve 58 on the inlet conduit 23a.

The operation of this embodiment of the invention is the same as described in connection with Figure 1 except that the deaerated water overflows directly into the storage compartment 59 of the tank 50 from where it is withdrawn to use.

In Figure 3 a condensate deaerator is arranged in the upper portion of a deaerating hot process softener. The softener shown in Figure 3 for purposes of exemplification and illustration is of the type described in said copending application of Walter H. Green and James M. Kahn, Serial No. 20,548. Briefly, in such an apparatus, the raw water to be softened and deaerated is preheated by steam in a heating chamber 61 in the top portion of the tank 60 and is then discharged through a conduit 63 to the space under a hood 64 where it is mixed with hardness precipitating chemicals and a slurry comprising water undergoing treatment and suspended particles precipitated in, and accumulated from, previously treated water. Steam discharged below the hood 64 causes a steam-lift supported circulation of the slurry through the tubes 65 and 66. During this circulation the chemical reactions and the deaeration of the water are completed. An output portion of treated liquid separates from the downwardly flowing slurry discharged from the outer tube and rises in the clarification chamber 67 to the overflow edge of the storage compartment 68 from where it is withdrawn through an outlet conduit 69. The deaerating hot process softener described above is not claimed herein.

With such an apparatus it is desirable to provide separate deaerating means for condensate which does not need softening and therefore should not be treated along with the raw water in the deaerating softener. Such a condensate deaerator and its storage compartment may conveniently be located in the upper part of the deaerating softener in the space which is not occupied by the heating chamber 61.

The condensate deaerator 70 is enclosed by an upper portion 62 of the wall of tank 60, a floor 71, a part of the top 72 of the tank 60, and a wall structure comprising an upper wall 75 extending downwardly from the top 72 and a lower wall 76 extending upwardly from the floor 71 to an elevation slightly above the lower end of the upper wall, as shown, whereby an outlet passageway 78 for deaerated condensate is formed between the overlapping ends of the walls 75 and 76.

The partition 20b which separates the lower chamber 22b from the preheating chamber 21b extends across the deaerator at the elevation of the lower end of the upper wall 75. As in the other embodiments, a partition structure 30b is axially aligned in the deaerator, the outer tube 32b extending through the partition 20b into the upper chamber to provide a steam and gas outlet from the steam lift passageway into the upper chamber. Water preheated in the upper chamber, and operating steam are discharged to the inner tube 31b through conduits 41b and 40b, respectively.

In this embodiment the vent condenser 15b is shown as extending through the top 72 into the upper chamber, surrounding the condensate inlet 23b.

A condensate storage compartment 59b provided with an outlet 56b is located between the heating chamber 61 and the condensate deaerator.

The pressure in the condensate deaerator may be lower than the pressure in the condensate storage chamber and the softener. To balance this pressure difference and to prevent steam from entering the condensate deaerator through passageway 78, a baffle 80 is provided whose lower end is submerged in the condensate in storage compartment 59b and whose upper end is above the elevation of the overflow edge of lower wall 76. The baffle 80 deflects the deaerated condensate leaving the lower chamber 22b through the passageway 78 and directs it downwardly. The head of the column of water between the maximum water level in the storage compartment 59b and the upper end of the baffle 80 must balance the predetermined maximum difference between the pressures prevailing inside and outside the condensate deaerator.

It is important in an apparatus of this type that the liquid level in the lower chamber be constant so that the steam lift operates against a constant head. This is obtained in simple manner in all embodiments of the invention by providing an overflow for the treated liquid.

Many modifications of the embodiments shown and described for purposes of illustration may be made without departing from the spirit and scope of the invention. Accordingly, I do not wish to limit myself to the exact details of these embodiments.

I claim:

1. Apparatus for deaerating water comprising wall means forming an upper heating chamber and a lower deaerating chamber separated from each other, means for introducing water to be treated into said upper chamber, a vent from said upper chamber, a partition structure comprising an inner tube having a lower end spaced above the bottom of said lower chamber and having an overflow, and an outer tube surrounding the upper portion of said inner tube and extending into said upper chamber to an elevation above said overflow, a conduit leading from the upper chamber and discharging to said inner tube, a steam inlet discharging to said inner tube, and an outlet for deaerated water from said lower chamber, said outlet establishing the liquid level in said lower chamber.

2. The apparatus of claim 1 comprising also a baffle spaced above the upper end of said outer tube in said upper chamber.

3. The apparatus of claim 1 including also a storage chamber for deaerated water, said outlet for deaerated water from said lower chamber being an overflow to said storage chamber, and an outlet from said storage chamber.

4. Apparatus of the type described comprising a deaerated water storage tank, a wall extending from the bottom of said storage tank to an elevation spaced below its top and separating in said storage tank, a central deaerating chamber from an outer storage compartment, the top edge of said wall providing an overflow from said deaerating chamber to said storage compartment, a heating chamber mounted on the top of said storage tank, inlet means for introducing water to be treated into said heating chamber including a spray head in said heating chamber, a vent leading from said heating chamber, a vertically extending inner tube centrally located in said deaerating chamber, an outer tube surrounding the upper portion of said inner tube and extending through the top of said storage tank into said heating chamber, a conduit leading from the lower portion of said heating chamber through the top of said storage tank and discharging to said inner tube, means for introducing steam into said inner tube, and an outlet for deaerated water from said storage tank.

5. Apparatus for deaerating liquid comprising a closed heating chamber having an inlet for liquid to be treated, a deaerating chamber subjacent said heating chamber, vertically extending partition means in said deaerating chamber spaced above the bottom thereof and forming a passageway for a steam lift supported circulation having an inner upflow section leading from the lower portion of said deaerating chamber to its upper portion, an outer downflow section surrounding said upflow section and leading from the upper to the lower portion of said deaerating chamber, an overflow from said inner section to said outer section, and a steam outlet from said outer section in open communication with said heating chamber at an elevation spaced above said overflow, a steam inlet discharging to said passageway, a liquid conduit leading from said heating chamber into said deaerating chamber and discharging to said passageway, a vent from said heating chamber, and an outlet for deaerated liquid from said deaerating chamber and establishing the normal liquid level therein.

6. Apparatus of the type described comprising wall means forming an upper chamber and a lower chamber separated from each other, inlet means for water to be treated into the upper chamber, a conduit leading from the upper chamber and discharging in the lower portion of the lower chamber, a steam inlet discharging adjacent said conduit, an inner tube and an outer tube in said lower chamber, said inner tube having an overflow to said outer tube, said outer tube extending into said upper chamber to provide a passageway for steam from the lower chamber into the upper chamber, said inner tube receiving the discharge of said conduit and of said steam inlet, an overflow from said lower chamber, and a vent from said upper chamber.

7. The apparatus of claim 3 wherein said outlet for deaerated water includes also a baffle extending from an elevation above said overflow to adjacent the bottom of said storage chamber and deflecting the water from said overflow downwardly.

JAMES M. KAHN.

REFERENCES CITED

The following references are of record in the file of this patent:

UNITED STATES PATENTS

| Number | Name | Date |
|---|---|---|
| 1,083,740 | Hodges | Jan. 6, 1914 |
| 1,464,918 | Andrews | Aug. 14, 1923 |
| 1,741,519 | Huff | Dec. 31, 1929 |